_United States Patent Office_

3,632,542
Patented Jan. 4, 1972

3,632,542
FILM FORMING COPOLYMERS OF ETHYLENE, VINYL CHLORIDE AND A VINYL ESTER AND THEIR PRODUCTION
David Brian Fox, Epsom, and Francis Paul Gintz, London, England, assignors to BP Chemicals (U.K.) Limited, London, England
No Drawing. Filed Apr. 25, 1968, Ser. No. 724,252
Claims priority, application Great Britain, May 5, 1967, 20,905/67
Int. Cl. C08f *15/30, 29/04, 45/24*
U.S. Cl. 260—29.6 T                    6 Claims

ABSTRACT OF THE DISCLOSURE

Aqueous dispersions of copolymers which are capable of drying to form films having good resistance to hydrolysis by aqueous alkali. The copolymers are formed from ethylene, vinyl chloride and a vinyl ester of an organic acid, e.g. vinyl acetate, and contain 5–25% ethylene units, 10–35% vinyl chloride units and 40–85% vinyl ester units.

---

The present invention relates to film forming aqueous dispersions of copolymers of vinyl esters of organic acids and other copolymerisable monomers and to a process for their manufacture.

Film forming aqueous dispersions of polymers are well known and widely used in surface or paper-coating technology, adhesives and other applications. The requirements are complex and depend upon the application. In the case of surface coatings the dispersions should be capable of coalescing to form films at low temperatures e.g. in the region of about 6–10° C. The films from pigmented dispersions should display a high general degree of resistance to ageing, including, for example, the effects of oxidation, sunlight, water and of particular importance, resistance to hydrolysis, where the surface coating is applied to alkaline substrates used in building.

An important class of surface coating dispersions is based upon copolymers of vinyl esters, such as vinyl acetate, containing major proportions of the vinyl ester copolymerised with other monomers such as acrylates, maleates or ethylene. Such copolymers are internally plasticised with these other monomers to give suitable film forming properties. While such copolymers show excellent general performance as surface coatings, limitations become apparent particularly where the films are used in exterior applications on alkaline substrates.

An object of the present invention is to provide aqueous dispersions of copolymers of vinyl esters of organic acids and other copolymerisable monomers which can be used as a basis for surface coating compositions that give rise to films having improved resistance to hydrolysis by aqueous alkali.

Film forming aqueous dispersions of copolymers according to the present invention comprise an aqueous dispersion of copolymer of ethylene, vinyl chloride and a vinyl ester of a saturated monocarboxylic acid wherein the percentage by weight in relation to the total weight of copolymerised ethylene, vinyl chloride and vinyl ester of (a) copolymerised ethylene is in the range 5 to 25%, (b) copolymerised vinyl chloride is in the range 10 to 35% and (c) copolymerised vinyl ester is in the range 40 to 85%.

The preferred percentage of copolymerised vinyl chloride is in the range 15 to 30%, the preferred percentage of copolymerised ethylene is in the range 10 to 20% and the preferred percentage of copolymerised vinyl ester is in the range 50 to 75%.

It is desirable, in order to maintain good film forming properties, to increase the copolymerised ethylene content of the copolymer as the vinyl chloride content is increased.

The acid component of the vinyl ester is most suitably derived from a linear or branched aliphatic mono-carboxylic acid. The preferred acids contain 2 to 12 carbon atoms. Some examples of suitable esters are vinyl acetate, vinyl propionate, vinyl butyrate, vinyl esters of tertiary aliphatic carboxylic acids such as Shell Chemical Company's "Veova 911," and vinyl benzoate. The invention is particularly concerned with the vinyl esters of acetic acid or substituted acetic acids e.g. trimethyl acetic acid. Mixtures of vinyl esters are also suitable.

Most suitably the film forming aqueous dispersions should contain 40 to 60% by weight of copolymer in relation to the total weight of the dispersion. The dispersion can be formulated as the surface coating compositions by addition of suitable pigments, thickeners and coalescing solvents.

A process for the manufacture of the copolymers according to the present invention as film forming aqueous dispersions thereof comprises copolymerising in aqueous dispersion in the presence of a free radical catalyst and a surface active agent and/or a protective colloid, ethylene, vinyl chloride and a vinyl ester of a saturated monocarboxylic acid in proportions by weight which give the required proportions of residues in the copolymer.

Free radical catalysts are well known and any such catalyst can be used in the present process. The catalyst can consist of a single compound or can comprise a plurality of compounds which act in combination as a system and can be water- or oil-soluble. Some examples are the organic and inorganic peroxides, persulphates and peroxy carbonates such as ammonium persulphate and the dialkyl percarbonates, e.g. di-isopropyl peroxy dicarbonate; azo compounds such as azo-bis-isobutyronitrile and redox systems such as ammonium persulphate/sodium metabisulphite, α-cumene hydroperoxide/ferrous iron complex, benzoyl peroxide/ferrous iron complex and an alkali metal chlorate/alkali metal sulphite.

The surface active agent can be selected from any of the known commercial ionic or non-ionic surface active products which can be used either singly or as mixtures. Some examples of ionic surface active agents are the anionic agents e.g. the alkali metal salts of alkaryl sulphonic acid (e.g. sodium dodecyl diphenyl ether disulphonate) alkali metal salts of long chain fatty acid sulphates (e.g. sodium lauryl sulphate) and esters of sodium sulphosuccinic acid (e.g. sodium dioctyl sulphosuccinate) and non-ionic agents such as ethylene oxide/nonyl phenol condensates, and long chain fatty acid mono esters of polyhydroxy alcohols (e.g. sorbitol mono-oleate).

The use of protective colloids in aqueous free radical polymerisation systems is well known and any such colloid can be used here. Some examples are polyvinyl alcohols and water soluble cellulose derivatives (e.g. cellulose ethers such as ethyl cellulose).

A catalyst activator may be present. Suitable activators are, for example, traces of transition metal salts, such as ferrous sulphate.

A chain transfer agent may be present. Suitable agents are long chain water-insoluble aliphatic mercaptans such as n- or tertiary dodecyl mercaptan.

Difunctional monomers such as divinyl succinate or glycol dimethacrylate may be used at levels up to 1% on total monomers to increase molecular weight or to produce cross-linking.

The polymerisation can be carried out by dispersing the reactants in water to form an emulsion or suspension. The weight of water in relation to the total weight of monomers charged is most suitably in the range 10:1 to 1:2 and preferably about 1:1.

The weight of vinyl chloride in relation to the total weight of liquid monomers (vinyl chloride and vinyl ester) charged is most suitably in the range 10 to 40% and preferably in the range 15 to 35%.

The weight of vinyl ester charged will depend on the selected ratio of vinyl chloride to vinyl ester.

The amount of ethylene used is normally governed by the ratio of vinyl chloride to vinyl ester charged and the nature of the acid component of the vinyl ester. It is most conveniently controlled by suitably adjusting the pressure of ethylene in the reactor, rather than by controlling the amount introduced.

The pressure at which the polymerisation can be carried out is not critical, however, it should be sufficient to keep the liquid reactants in the liquid phase. Most suitably the ethylene is introduced into the reaction vessel under a pressure of 10 to 100 atmospheres and preferably 25 to 70 atmospheres. This pressure is maintained throughout the polymerisation.

Most suitably the weight of catalyst in relation to the weight of monomers charged is in the range 0.1 to 2.0% and preferably in the range 0.2 to 1.0%. The weight of the surface active agent is preferably in the range 0.5 to 6.0% and the weight of the catalyst activator is preferably in the range 0.001 to 1.0%.

The process can be batch, semi-continuous or continuous.

The vinyl chloride or vinyl ester or ethylene or any two or all three can be proportionated. The ethylene may be introduced intermittently.

Preferably both the vinyl chloride and the vinyl ester are proportionated to the polymerisation at the rate required to maintain the temperature in the desired range and the concentration of unpolymerised monomer at a low level e.g. in the range 0.1 to 10% by weight of the total monomer in the charge. In order to minimise the formation of several consecutive vinyl chloride monomer units in the resultant copolymer, the free monomer in the charge should preferably contain a molar excess of the vinyl ester. Copolymers containing long sequences of vinyl chloride units have a tendency to discolour on exposure to ultra violet radiation, and conditions favouring their production should be avoided.

The temperature is not critical and any temperature which gives a sufficiently rapid reaction is suitable. This temperature will depend on the catalyst system used and is preferably in the range 40° C. to 100° C.

The pH of the dispersion should be maintained within the range 4.0 to 6.0 so as to prevent hydrolysis of the vinyl ester. A suitable buffering agent such as potassium or sodium bicarbonate can be added for this purpose.

The polymerisation is carried out in the substantial absence of oxygen.

Stable aqueous dispersions of the copolymer having a solids content of up to 60% can be obtained by suitably adjusting the polymerisation conditions and the proportions of monomers.

The following examples illustrate a process for the manufacture of aqueous dispersions of copolymers according to the present invention and the properties of films formed from these dispersions.

EXAMPLE 1

The total charge to the reactor was as follows:

| | Total charge, grams |
|---|---|
| Nansa SS 60 (a registered trade mark for sodium dodecyl benzene sulphonate) | 3.3 |
| Arkopal N 300 (a registered trade mark for a nonyl phenol/ethylene oxide condensate) | 13.2 |
| Potassium bicarbonate | 2.9 |
| Water | 810 |
| Vinyl acetate | 490 |
| Vinyl chloride | 234 |
| Ammonium persulphate | 5.0 |
| Sodium metabisulphite | 5.0 |
| Ethylene | --- |

7.2 grams of Arkopal N 300 together with the Nansa SS 60 and potassium bicarbonate were dissolved in the water, the quantity of water used being the total charge less 140 mls. for dissolving the sodium metabisulphate and 25 mls. for the ammonium persulphate. The aqueous charge was then placed in the reaction vessel and 60 mls. of vinyl acetate added. The reactor was purged with ethylene and heated. When the temperature had been adjusted to 60° C. the ammonium persulphate was added and the ethylene pressure adjusted to 700 p.s.i. The vinyl acetate containing 6 grams of Arkopal N 300 and the vinyl chloride were pumped into the reaction vessel over four hours and the sodium metabisulphite over 6 hours. The ethylene pressure was kept constant at 700 p.s.i. throughout the reaction. The reactants were stirred continuously for 6 hours. After cooling the unreacted ethylene was vented off.

Analysis of a copolymer film cast from the dispersion thus formed showed that it contained 27.4% by weight of vinyl chloride.

By way of comparison a film forming aqueous dispersion of an ethylene/vinyl acetate copolymer was formed in a similar manner to the foregoing and films from these dispersions together with a commercial vinyl acetate/2-ethyl hexylacrylate copolymer dispersion were cast on mercury. When dry, squares with a side of one inch were cut and dried to constant weight.

The films were then submerged in 25% aqueous sodium hydroxide solution at 50° C. for four days. At the end of this time the films were washed with distilled water and then soaked in distilled water for three to four days to remove adsorbed sodium hydroxide. The films were dried to constant weight. The commercial copolymer of vinyl acetate 2-ethyl hexylacrylate had begun to disintegrate after hydrolysis whereas the other polymer films were still intact. The percentage loss in weight of each film due to hydrolysis was then determined and the results given in the table.

EXAMPLE 2

Ethylene, vinyl chloride and vinyl acetate were copolymerised using the recipes and conditions described in Example 1 with the following differences.

The total charge to the reactor of vinyl chloride was 201 grams and of vinyl acetate was 523 grams, the ethylene pressure was adjusted to 700 p.s.i. and maintained at this pressure throughout the reaction.

The resulting copolymer dispersion was cast into films which were analysed and tested for hydrolysis using the procedure described in Example 1.

The results are given in the table.

EXAMPLE 3

Ethylene, vinyl chloride and vinyl acetate were copolymerised using the recipes and conditions described in Example 1 with the following differences.

The total charge to the reactor of vinyl chloride was 130 grams and of vinyl acetate was 594 grams and the ethylene pressure was adjusted to 550 p.s.i. and maintained at this pressure throughout the reaction.

The resulting copolymer dispersion was cast into films which were analysed and tested for hydrolysis using the procedure described in Example 1.

The results are given in the table.

TABLE

| Copolymer | Sample No. | Initial wt. (grams) | Wt. after hydrolysis | Percent wt. loss |
|---|---|---|---|---|
| Control: Vinyl acetate (82% by wt.)/2-ethylhexyl acrylate (18% by wt.) | 1 | 0.712 | 0.093 | 85.6 |
| | 2 | 0.766 | 0.105 | 86.3 |
| | 3 | 0.840 | 0.113 | 86.6 |
| Mean | | | | 86.2 |
| Control: Ethylene (14.5% by wt.)/vinyl acetate (85.5% by wt.) | 1 | 0.607 | 0.443 | 27.0 |
| | 2 | 0.607 | 0.450 | 25.9 |
| | 3 | 0.630 | 0.466 | 26.0 |
| Mean | | | | 26.3 |
| Example 1: Ethylene (16.2% by wt.)/vinyl acetate (56.3% by wt.)/vinyl chloride (27.4% by wt.) | 1 | 0.775 | 0.767 | 1.0 |
| | 2 | 0.861 | 0.846 | 1.7 |
| | 3 | 0.713 | 0.703 | 1.4 |
| Mean | | | | 1.4 |
| Example 2: Ethylene (17.7% by wt.)/vinyl acetate (61.5% by wt.)/vinyl chloride (20.8% by wt.) | 1 | 0.382 | 0.376 | 1.6 |
| | 2 | 0.289 | 0.285 | 1.4 |
| | 3 | 0.417 | 0.409 | 1.9 |
| Mean | | | | 1.6 |
| Example 3: Ethylene (14.0% by wt.)/vinyl acetate (70.5% by wt.)/vinyl chloride (15.3% by wt.) | 1 | 0.564 | 0.523 | 7.3 |
| | 2 | 0.424 | 0.392 | 7.6 |
| | 3 | 0.417 | 0.388 | 7.0 |
| Mean | | | | 7.3 |

These results show that films formed from copolymers according to the present invention have a surprisingly high degree of resistance to hydrolysis in comparison with films formed from ethylene/vinyl acetate copolymers or from vinyl acetate/2-ethyl hexylacrylate copolymers.

We claim:

1. A film forming aqueous dispersion of a copolymer, the films formed from which on drying to constant weight and subjecting to 25% aqueous sodium hydroxide for 4 days at about 50° C., hydrolyze substantially less than about 26% in terms of weight loss of a one-inch square film having a weight range of about 0.9 to about 0.3 gram initial weight, which comprises an aqueous dispersion of a copolymer of ethylene, vinyl chloride and a vinyl ester of a saturated monocarboxylic acid wherein the percentage by weight in relation to the total weight of copolymerised ethylene, vinyl chloride and vinyl ester of (a) copolymerised ethylene is in the range 5 to 25%, (b) copolymerised vinyl chloride is in the range 10 to 35% and (c) copolymerised vinyl ester is in the range 40 to 85%.

2. A film forming aqueous dispersion of a copolymer as claimed in claim 1, wherein the vinyl ester of the saturated monocarboxylic acid is vinyl acetate.

3. A film forming aqueous dispersion of a copolymer as claimed in claim 1, wherein the amount of copolymerised vinyl chloride is in the range of 15 to 35%.

4. A film forming aqueous dispersion of a copolymer as claimed in claim 2, wherein the copolymerised ethylene is in the range of 10 to 20%, the copolymerised vinyl chloride is in the range of 15 to 35% and the copolymerised vinyl acetate is in the range of 50 to 75%.

5. A film forming aqueous dispersion of a copolymer as claimed in claim 1, wherein the copolymer is 40 to 60% by weight, based on the total weight of the dispersion.

6. A method for preparing a film forming aqueous dispersion of a copolymer as claimed in claim 1, which comprises copolymerizing in aqueous dispersion at a pH in the range 4 to 6, a temperature in the range 40 to 100° C. and a pressure in the range 10 to 100 atmospheres in the substantial absence of oxygen, ethylene, vinyl chloride and a vinyl ester of a saturated monocarboxylic acid wherein vinyl chloride and vinyl etser are added to the aqueous dispersion during polymerization so that the concentration of unpolymerized vinyl chloride and vinyl ester in the dispersion is maintained in the range 0.1 to 10% by weight of the total vinyl chloride and vinyl ester to be polymerized.

References Cited

UNITED STATES PATENTS

| 2,449,489 | 9/1948 | Larson | 260—29.6 H UX |
| 2,703,794 | 3/1955 | Roedel | 260—29.6 T UX |
| 2,935,484 | 5/1960 | Arnold et al. | 260—29.6 TA UX |
| 3,347,811 | 10/1967 | Bissot | 260—29.6 TA UX |
| 3,409,578 | 11/1968 | Hwa | 260—29.6 TA |

PHILIP E. ANDERSON, Primary Examiner

U.S. Cl. X.R.

260—29.6 XA, 78.5 R, 78.5 HC